Patented Aug. 2, 1949

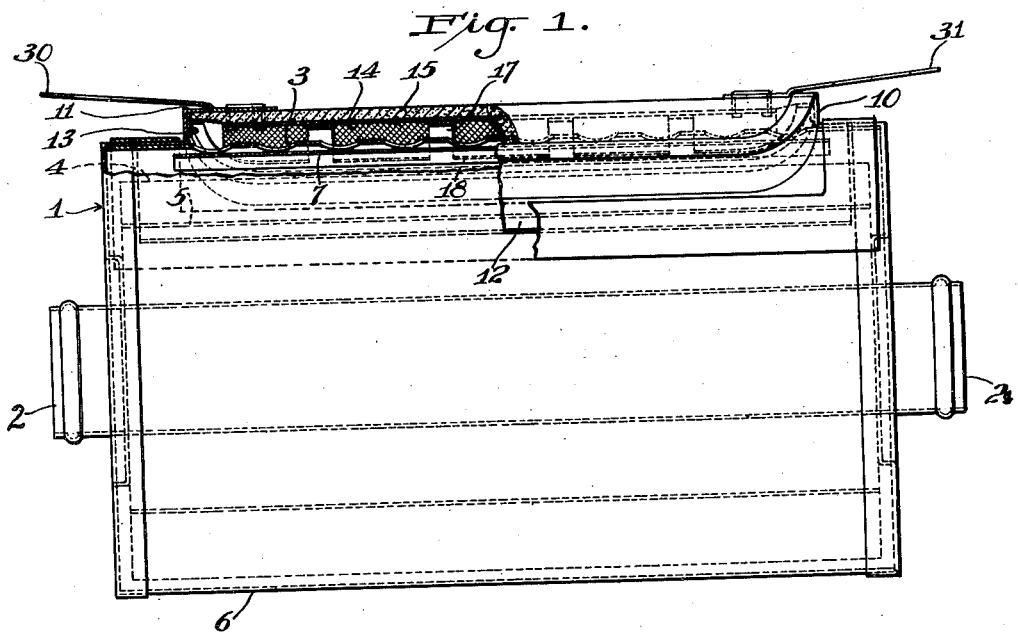
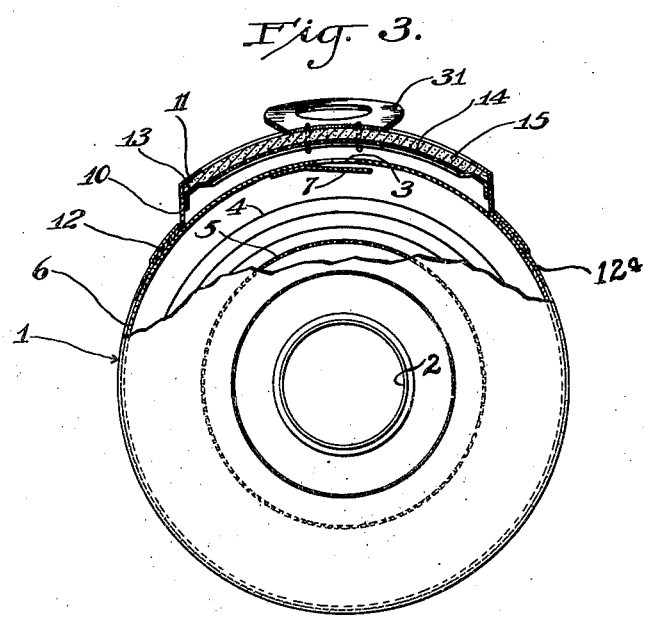

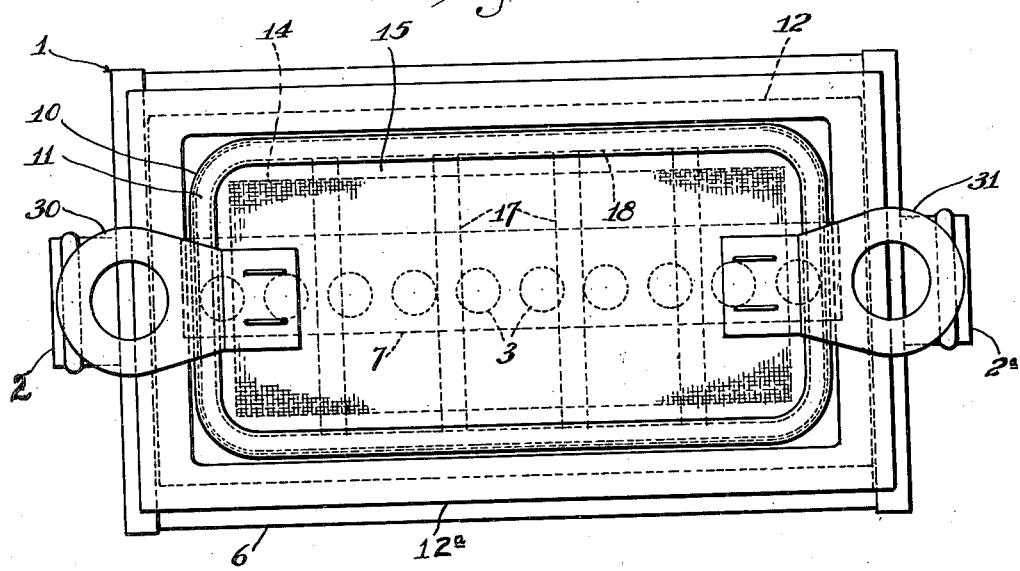
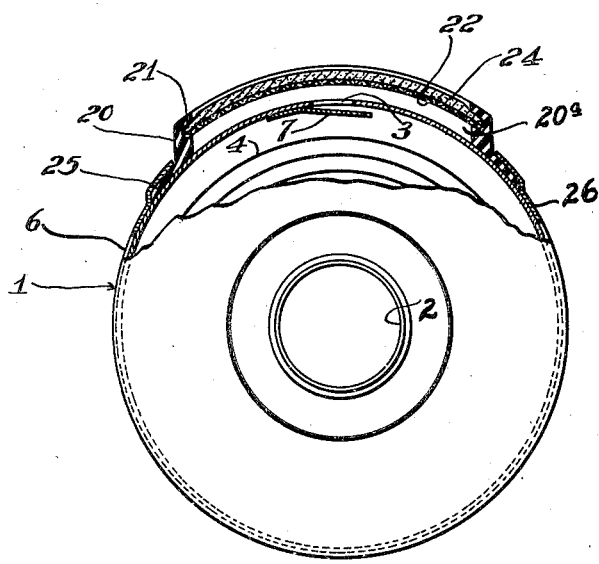

2,478,054

UNITED STATES PATENT OFFICE 2,478,054

LIQUID PROTECTOR FOR AIR PURIFYING CANISTERS

Kenneth B. Ray and William P. Yant, Pittsburgh, Pa., assignors to Mine Safety Appliances Company, Pittsburgh, Pa.

Application August 3, 1940, Serial No. 350,570

10 Claims. (Cl. 183—44)

This invention relates to a protective means adaptable as a water protector for materials within an air purifying canister and more particularly to a means capable of providing adequate protection in the event that the canister should be submerged unintentionally to a substantial depth of water.

Apparatus of the nature of respiratory protection devices may contain some form of a mechanical filter means of a compact and permissable fibrous material such as paper, felt, asbestos or a synthetic fibrous material. In addition, a quantity of chemical materials may be used as a means of removing contaminants from air. Both of these lose their filtering efficiency and increase in resistance to the movement of air beyond usable limits when subjected to water or liquids of the same nature. In many instances apparatus employing these filters is used in locations where large amounts of water are present and in which the air purifying canister may be unintentionally submerged or subjected to sprays of water or streams or used in atmospheres containing a large amount of water in suspension and the materials within the canister thus become wetted and inoperative.

An object of this invention is to provide a liquid repellent and air permeable means adaptable to a canister as a protective device and operative to protect the air purifying materials contained within the canister against water or similar liquids.

It is a further object of this invention to provide a liquid repellent and air permeable means which is adaptable to a canister as a protective means and which is operative to protect the materials contained therein when the canister is subjected to water or similar liquids at some pressure and for a period of time such as would be encountered in unintentionally submerging the canister in water to a depth of a foot or more.

It is a more specific object of this invention to provide a means adaptable to support a liquid repellent and air permeable element onto the several types of canister body in protective relation to the air purifying materials contained therein and without requiring any modification in construction or alteration of the canister body.

Other objects of this invention will become apparent from a description of the embodiments of my invention which illustrate the principle involved therein and which disclose the application of the invention to one type of a widely used canister construction.

The invention is concerned with providing a suitable element for a canister which will repel water or similar fluids at and for certain severe conditions and which is and remains sufficiently permeable to air. Many of the available textile or fabric materials treated with available water repellent materials, such as the emulsified wax preparations are suitable as a water protective element for ordinary requirements. However, the requirements of some uses have rendered such materials impractical because of the fact that for some purposes it is necessary that the element be and remain permeable to air and repel water at substantial pressures, that is, at pressures which would be encountered should the canister be submerged under water at a depth of about 1 ft. and for a short period of time. Fibrous air permeable filter material such as wool, cellulose or felt when sufficiently and properly treated with a suitable water repelling agent, such as a stabilized wax emulsion or a quaternary ammonium salt preparation, repel water under the conditions as set forth above and continues to be adequately permeable to air. As an example, a fibrous cellulose material of about $\frac{3}{32}''$ in thickness and suitably permeable to air is treated with one of the water soluble wax emulsion preparations. Immersing the fibrous material into a 10% water solution of the emulsion having a pH of about 4½ to 6, and at a temperature of about 140° F. sufficient water repellent material is deposited on to and coats the individual fibers by allowing the material to be completely covered by the solution. The material is then removed and the excess liquid drained. The emulsion is broken by heating the treated fibrous material to a temperature of about 160° F. and maintaining the material at this temperature and in a current of dry air for about an hour and a half. During this time a thin film of wax is formed on the individual fibres.

Another class of repellent agents which have been used successfully in treating cellulose fibrous materials are the quaternary ammonium salts. A particular group of this class which is especially effective are those of the type formula

ROCH$_2$NR'R''R'''X in which R stands for an aliphatic hydrocarbon radical of twelve or more carbon atoms and NR'R''R''' stands for an aliphatic or heterocyclic tertiary amine and X stands for a halogen atom.

In treating filter material with a compound of this class, the material is completely immersed in an aqueous solution of the compound, withdrawn from the solution, drained of excess liquor and treated at a temperature high enough to decompose the compound in the solution and to deposit a thin layer of water repellent substance on the fibres.

An important feature of this invention is providing a support for the protective element which is unitary, readily assembled and adaptable to the standard types of canister body or housing used to seal the elements to the body except through the material of the element. The embodiments illustrated in the drawings show the adaptation of a support to one standard type of an air purifying canister. In the drawings, Fig. 1 is a view partly in section illustrating the canister and one embodiment of a means for properly supporting the protective element on the canister body;

Fig. 2 is a plan view of the embodiment illustrated in Fig. 1;

Fig. 3 is an end view partly in section thereof;

Fig. 4 is a fragmentary sectional view illustrating another embodiment of a support for the protective element.

Referring to the drawings, an air purifying canister 1 which is usually made of sheet metal material contains outlet openings 2 and 2a and a series of inlet openings 3 which are disposed along the length of the canister. A usual arrangement of air purifying materials in the canister when it is to include both a mechanical fibrous filter means and chemical materials is to provide an inner chamber in which the materials are contained and a fibrous filter material 4 which envelopes the chamber by bending around the perforated metal partition 5 which defines the outer limits of the chamber. The body 6 of the canister is represented as being circular in shape although such shape is not a necessary requirement in the adaptation of the support thereto although most designs of canisters contain rounded or curved surfaces for the purpose of convenience in carriage. The baffle 7 connected to the inside of the body and overlying the openings 3 tends to direct the flow of air in one direction as it enters the opening and is effective to some extent in removing foreign matter contained in the atmosphere to be purified. This arrangement provides little protection against the entrance of water or fluids of similar nature and should the canister be submerged even instantly in a bath of water the water entering the opening is absorbed immediately by the air purifying filter 4 and renders it ineffective and if continued water would penetrate to the chemical materials.

With our invention a water protective element 15 is placed in the path of flow of air into the canister and in the embodiments it actually overlies the inlet openings 3 and is thus interposed in the path of air to be purified and it possesses sufficient water repellency by a treatment as heretofore described. Such a protector is preferably that of a fibrous material having ample thickness to enable the mass to be sufficiently water repellent.

One form of apparatus suitable for supporting and sealing the protective element 15 to the canister surface positions the element in spaced relation to the openings 3 in order to provide an ample effective outlet surface area of the material and so as to prevent any restriction of the inlet openings of the canister. The element is supported on to the outside of the canister 1 by means of a framelike structure 10 which can be made of any suitable sheet metal or any other material possessing sufficient strength to support and hold the filter in a spaced position. The structure 10 contains an inwardly directed flange 11. The flange 11 retains the element 15 and is brought into sealing engagement therewith by an inner support 13 which is flexed into engagement with the sides of the frame structure 10. This inner support 13 of thin sheet metal material carries a perforated metal such as a layer of wire 14 in order to adequately support the element 15 throughout its outlet surface area since the inner support preferably contains a small mass in order to be readily insertable into position and has sufficient strength to seal the element 15 to the flange 11. This support 13 is slightly larger in size than the size of the framelike structure to enable flexing and to bind the support to the structure and contains lateral strips 17 which are integral with a peripheral strip 18. The thin material of this support allows a space between the under surface of the foraminous support and the inlet openings 3 to provide the necessary and unrestricted passage for air passing from the protective element to the inlet openings.

When the structure is assembled as illustrated in Fig. 3, it is then attached to the body of the canister by means of adhesive strips 12a which engage the outwardly extending flange 12 and the body of the canister. With this arrangement, the assembly is adaptable universally to many modifications of canister body design and in addition is relatively inexpensive in construction and readily and easily applied to a canister surface and which is very effective in producing adequate protective facilities and which can be readily removed from the canister in the event the occasion arises. The tabs 30 and 31 which are stapled or otherwise fastened to each end portion of the fibrous material provide means for quickly removing the protective assembly from the body of the canister.

Another arrangement for supporting the protective element is illustrated in Fig. 4. The protective element in this instance is designated as 24 and is contained within a resilient framelike structure similar to the structure 10 of Fig. 3 and contains an inner recess 21 to accommodate a perforated element 22 in addition to the protective element 24. With this arrangement, it is necessary that the recess within the structure be located sufficiently adjacent the upper extent of the structure so that the wire and protective element can be inserted from the top and then sealed thereto by means of any suitable sealing and adhesive agent which adheres sufficiently to the fibrous material and to the material of the structure. The layer of wire 22 is sufficiently strong to adequately support the protective element when reinforced by narrow lateral strips 20a which are integral with the structure 20 and which are spaced similar to the strips 17 of support 13, Fig. 3 and which rest against the outer surface of the canister. After the assembly is made, the outwardly directed flange 25 of the frame 20 is then sealed to the body of the canister such as described in connection with the assembly of the other embodiment, that is, by applying an adhesive strip 26.

With such a support and a protective element carried thereby, the materials within the canister or in the apparatus beyond the position of this element are protected and the resistance to the flow of air through the canister is not increased to any appreciable extent and the filtering efficiency of the materials in the canister is not impaired.

It is recognized that other modifications can be made of a support for the protective element and which could be adaptable to a canister body, and furthermore, it is recognized that various arrangements can be made in the support of a protective element in relation to the air passage formed in a canister and leading to the air purifying materials contained within. I have explained the principle and mode of operation of my invention and I desire to have it understood that, within the scope of the appended claims, the invention may be practiced otherwise than as specifically illustrated and described.

We claim:

1. In an air purifying apparatus, a canister having a body with an inlet opening, a liquid repellent means overlying the opening, an outer support means for the liquid repellent means, an inner support means operative with the outer support means to seal the liquid repellent means to the outer support means and a means to attach and seal the outer support means to the body.

2. In an air purifying apparatus, a canister having a body with an inlet opening, a liquid repellent means overlying the opening and a support therefor engaging a surface of the canister and comprising an outer enclosure, an apertured support to seal the liquid repellent means to the enclosure and to support the repellent means in spaced relation to the inlet opening of the canister and a means to connect the enclosure in sealed relation to the body of the canister.

3. In an air purifying apparatus, a canister having an inlet opening and adapted to confine and support air purifying materials, a liquid repellent element positioned in overlying relation to the inlet opening, a framelike structure engaging the body of the canister and abutting a peripheral portion of the element, a perforated holding means resiliently engaging the sides of the framelike structure and supporting the element in abutting relation to the structure and in spaced relation to the inlet opening of the canister and a means to seal the structure to the body of the canister.

4. In an air purifying canister, a container body having an inlet opening, a liquid repellent element positioned in overlying relation to the inlet opening, an enclosure with a central opening engaging the body of the canister and containing an inwardly directed flange, a foraminous element fitted within the enclosure to support the entire area of the element in spaced relation to the container body, a support means engaging the enclosure and operative to seal a peripheral portion of the element to the inwardly directed flange and means to detachably connect and seal the enclosure to the body of the canister.

5. In an air purifying canister, a container body having an inlet opening, a liquid repellent means overlying the opening, a flexible framelike structure surrounding the element and having an inwardly directed flange abutting and sealed to a peripheral portion of the element, the structure having a means engaging a surface of the body, and apertured support means for the element and supported by engagement with the structure and operative to support the element in spaced relation to the opening and a means to detachably connect and seal the structure to a surface of the body.

6. In an air purifying canister, a container body having an inlet opening, a liquid repellent element overlying the opening, a flexible framelike structure engaging a surface of the body of the canister and containing an inwardly extending flange abutting and sealed to a peripheral portion of the element, the structure having spaced means extending across the opening in the structure and each having a surface engaging a surface of the body of the canister to support the operative surface of the element in spaced relation to the body, a foraminous element within the structure and interposed between the spaced means and the liquid repellent element to reinforce the element over its operative area and means to detachably connect and seal the structure to the body.

7. In combination with an air purifying canister having an inlet opening, a liquid interstitial repellent means overlying the opening and a support for the repellent means attached to the body of the canister.

8. In combination with an air purifying canister having an inlet opening, a liquid repellent means overlying the opening and composed of a body of material having air passages therethrough defined by disposition of elements constituting the body, the elements being treated with an agent to render the mass liquid repellent and without interfering substantially with the air passages existing in the original material and support means therefor attached to the body of the canister.

9. In combination with an air purifying canister having an inlet opening, a liquid repellent means suitably permeable to air and overlying the opening and a support therefor comprising a means in sealing engagement with the repellent means and a means to attach in a sealing relation the support means to the body of the canister.

10. In a canister a canister body having an inlet opening, a liquid repellent air permeable means closing off the opening and a support therefor.

KENNETH B. RAY.
WILLIAM P. YANT.

No references cited.